A. G. Bradford,
Chain Pump.
Nº 35,499. Patented June 10, 1862.

UNITED STATES PATENT OFFICE.

ALBERT GREEN BRADFORD, OF FREEPORT, ILLINOIS.

IMPROVEMENT IN CHAIN-PUMPS.

Specification forming part of Letters Patent No. 35,499, dated June 10, 1862.

*To all whom it may concern:*

Be it known that I, ALBERT GREEN BRADFORD, residing at present at Freeport, in the county of Stephenson, in the State of Illinois, have invented an Improvement in the Mode of Constructing Chain-Pumps; and I do hereby declare that the following is a full and exact description thereof, reference being had to the accompanying drawings, and to the letters of reference marked thereon.

The nature of my invention consists in providing a succession of small buckets connected together, so as to form an endless series of buckets for the purpose of elevating water or other fluids with less friction and greater expedition than with the old chain and buttons.

To enable others skilled in the art to make and use my invention, I will proceed to describe its construction and operation.

Figure 1:
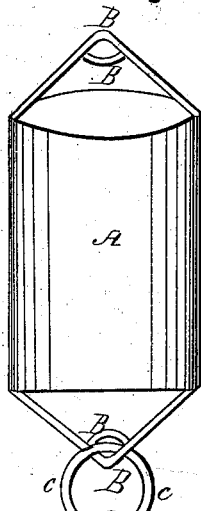

I construct my buckets A in the form of a cylinder having handles at each end with a loop or hole in the middle of it, as shown at B B, Figure 1, for the purpose of receiving the connecting-rings, as shown at $c\ c$, Fig 1.

Figure 2:
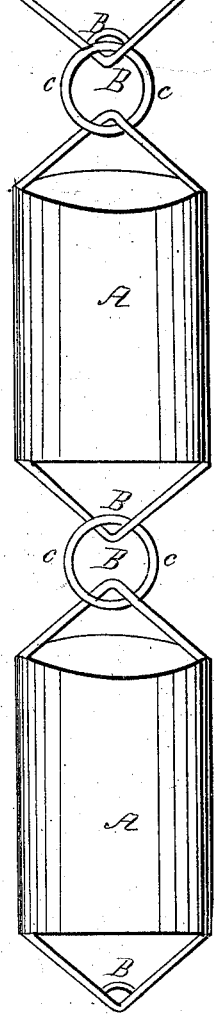

The improvement consists in substituting a chain of small buckets of a convenient size, fastened together by means herein described, for the common chain and buttons and for the common belt now used, by the use of which chain of small buckets more water will be lifted in less time; or I make the handles with an angle in the middle to prevent the rings $c\ c$, Fig. 2, from slipping from the center of the handle, where they are connected together; but this I do not claim.

I make my buckets of iron or any other suitable metal, or of gutta-percha, india-rubber, or wood.

In order to have no waste of water, the pump can be constructed with a trough of sufficient width and length to pass under and beyond the chain of buckets, with a small aperture on each side in the bottom of the same to allow the buckets to pass through in ascending on the one side and descending on the other. To prevent freezing, the pump is simply reversed and the buckets will empty themselves freely.

What I claim as my invention, and desire to secure by Letters Patent, is—

The combination of the buckets with the handles and connecting-rings when used for the purpose of elevating water or other fluids, substantially as specified.

ALBERT GREEN BRADFORD.

Witnesses:
JOHN TRIDEI.,
WM. B. REA.